United States Patent
Fields et al.

(10) Patent No.: US 7,793,260 B2
(45) Date of Patent: Sep. 7, 2010

(54) SYSTEM FOR DEFINING AND ACTIVATING PLUGGABLE USER INTERFACE COMPONENTS FOR A DEPLOYED APPLICATION

(75) Inventors: Brendan C. Fields, Woodinville, WA (US); Karim M. Batthish, Seattle, WA (US); Russell L. Simpson, Jr., Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1127 days.

(21) Appl. No.: 11/113,653

(22) Filed: Apr. 25, 2005

(65) Prior Publication Data
US 2006/0242124 A1 Oct. 26, 2006

(51) Int. Cl.
*G06F 9/44* (2006.01)
(52) U.S. Cl. .................................. 717/121; 715/744
(58) Field of Classification Search ....................... None
See application file for complete search history.

(56) References Cited

U.S. PATENT DOCUMENTS

| | | | | |
|---|---|---|---|---|
| 5,115,501 | A * | 5/1992 | Kerr | 707/9 |
| 6,016,478 | A | 1/2000 | Zhang et al. | |
| 6,292,803 | B1 | 9/2001 | Richardson et al. | |
| 6,574,639 | B2 | 6/2003 | Carey et al. | |
| 6,591,277 | B2 | 7/2003 | Spence et al. | |
| 6,738,077 | B1 * | 5/2004 | Wendker et al. | 715/744 |
| 6,934,697 | B1 * | 8/2005 | Warren | 707/1 |
| 7,353,234 | B2 * | 4/2008 | Kimball et al. | 707/102 |
| 7,412,457 | B2 | 8/2008 | Saracco et al. | |
| 7,447,745 | B2 | 11/2008 | Lehavi | |
| 7,587,501 | B2 | 9/2009 | Stillion et al. | |
| 2002/0059425 | A1 * | 5/2002 | Belfiore et al. | 709/226 |
| 2002/0095454 | A1 | 7/2002 | Reed et al. | |
| 2002/0129331 | A1 | 9/2002 | Zhang et al. | |
| 2003/0014421 | A1 | 1/2003 | Jung | |
| 2003/0065742 | A1 | 4/2003 | Culp et al. | |
| 2003/0163479 | A1 | 8/2003 | Mathews et al. | |
| 2004/0001081 | A1 * | 1/2004 | Marsh | 345/721 |
| 2004/0117482 | A1 * | 6/2004 | Salazar | 709/225 |

(Continued)

FOREIGN PATENT DOCUMENTS

EP 1122672 A2 8/2001

(Continued)

OTHER PUBLICATIONS

Amer-Yahia et al, A Comprehensive Solution to the XML-to-Relational Mapping Problem, Proceedings of the 6th annual ACM International Workshop on Web Information and Data Management, 2004, pp. 31-38, Retrieved on [Jun. 17, 2010], Retrieved from the Internet:URL<http://portal.acm.org/citation.cfm?id=1031453.1031461>.*

(Continued)

*Primary Examiner*—Tuan Q Dam
*Assistant Examiner*—Cheneca Smith
(74) *Attorney, Agent, or Firm*—Senniger Powers LLP (57) ABSTRACT

Maintaining a plurality of application component catalogs describing user experiences associated with particular application programs. The invention includes an extensible schema for the application component catalogs and a method for matching user experiences within the application component catalogs to particular user requests. The invention provides an extensible and scalable infrastructure for customizing a user interface experience.

17 Claims, 5 Drawing Sheets

U.S. PATENT DOCUMENTS

| | | |
|---|---|---|
| 2004/0236749 A1 | 11/2004 | Cortright et al. |
| 2005/0050068 A1 | 3/2005 | Vaschillo et al. |
| 2005/0086306 A1 | 4/2005 | Lemke |
| 2005/0172261 A1* | 8/2005 | Yuknewicz et al. ......... 717/106 |
| 2005/0235258 A1* | 10/2005 | Wason ........................ 717/110 |
| 2009/0083314 A1 | 3/2009 | Maim |

FOREIGN PATENT DOCUMENTS

| | | |
|---|---|---|
| WO | 0198933 A1 | 12/2001 |

OTHER PUBLICATIONS

Elmasri et al, Conceptual Modeling for Customized XML Schemas, Conceptual Modeling—ER 2002, pp. 429-443, Retrieved on [Jun. 17, 2010], Retrieved from the Internet:URL<http://www.springerlink.com/content/ry46wmun9xmy11rn/fulltext.pdf>.*

"Customizing Microsoft Outlook Web Access," White Paper, Microsoft Exchange 2000 Server, Nov. 2001, 106 pages, Microsoft Corporation, U.S.A.

* cited by examiner

SYSTEM FOR DEFINING AND ACTIVATING PLUGGABLE USER INTERFACE COMPONENTS FOR A DEPLOYED APPLICATION

TECHNICAL FIELD

Embodiments of the present invention relate to the field of user interfaces. In particular, embodiments of this invention relate to an infrastructure for customizing components of a user interface for a particular application program.

BACKGROUND OF THE INVENTION

Some server-deployed, web-based mail application programs give users access to their centrally located mailboxes. These application programs also provide the ability to send and receive electronic mail (email), schedule appointments, and perform other personal information management (PIM) tasks from a network such as the Internet. Some of these application programs execute in a browser and are a companion to other PIM application programs. In existing systems, many aspects of the user interfaces for the server-deployed application programs and other application programs are hard-coded. The barrier to changing the user experience in these applications in a significant way is significant. For example, every change to the infrastructure that is used to select rendering for folders, items, and extensions to the user preferences user interface requires re-validating many aspects of the application programs to prevent regressions. Further, many aspects of the application programs (e.g., navigation pane, user preferences, and hypertext markup language forms-based authentication) need to segment selectively. The existing systems lack a scalable model or infrastructure for tailoring a user interface for a particular application program.

Accordingly, a system for defining and activating pluggable user interface components is desired to address one or more of these and other disadvantages.

SUMMARY OF THE INVENTION

Embodiments of the invention include an application component catalog, an application element data store, or the like that allows developers to extend a user interface, override the user interface, and/or tailor the user interface. The application component catalog describes the user experiences and application element mappings for an application and for a user. In an embodiment, the invention includes a method for loading the application component catalog and a method for activating application elements and selecting user interface experiences based on incoming requests.

The invention includes a model that is easy-to-use, flexible, and supportable. The invention allows modular construction and definition of user experiences with an application program. For example, the invention allows definition of a user interface (or a portion thereof) to render when dealing with data representation metaphors such as folders and items, sections of user options, and elements exposed in a navigation page. The invention sustains a broad set of user interface customization without affecting the supportability or integrity of the application.

In accordance with one aspect of the invention, a system includes a computer-readable medium storing a data structure representing a schema defining user experiences associated with various application program. The data structure includes a plurality of experience fields each storing an experience value representing a user interface experience associated with an application program. The data structure also includes a plurality of application element fields for each of the plurality of experience fields. Each of the plurality of application element fields stores an application element value representing an application element associated with the experience value stored in the experience field. The data structure also includes an element class field for each of the plurality of application element fields. The element class field stores an element class value representing an action, state, or form associated with the application element value stored in the application element field. The system further includes a processor configured to execute computer-executable instructions for receiving a request for data from the application program, identifying one of the plurality of experience fields in the data structure as a function of the application program, identifying one of the plurality of application element fields associated with the identified experience field as a function of the requested data, and providing, to the application program, the requested data via the element class value associated with the application element value in the identified application element field.

In accordance with another aspect of the invention, a computerized method provides a user interface experience upon request. The computerized method includes receiving a request for data from software. The received request identifies a user associated with the request. The computerized method also includes identifying an application component catalog from a plurality of application component catalogs as a function of the user. The application component catalog includes a plurality of user interface experiences. The computerized method further includes identifying one of the plurality of user interface experiences in the identified application component catalog as a function of the software. The identified user interface experience has a plurality of application elements associated therewith. The computerized method further includes identifying one of the plurality of application elements as a function of data in the request. The computerized method also includes providing the requested data via the identified application element.

In accordance with yet another aspect of the invention, one or more computer-readable media have computer-executable components for providing a user interface experience upon request. The components include a communications component for receiving a request for data from software. The received request identifies a user associated with the request. The received request has an action value and a state value. The components also include a user mapping component for identifying an application component catalog corresponding to the user. The application component catalog includes a plurality of user interface experiences. The components also include an experience mapping component for identifying one of the plurality of user interface experiences in the identified application component catalog based on the software. The identified user interface experience has a plurality of forms associated therewith. The components also include a user interface mapping component for identifying one of the plurality of forms in the identified user interface experience as a function of the action value and the state value. The communications component provides the identified form to the software.

Alternatively, the invention may comprise various other methods and apparatuses.

Other features will be in part apparent and in part pointed out hereinafter.

BRIEF DESCRIPTION OF THE DRAWINGS

Appendix A shows the aspects of an exemplary schema of the invention.

Appendix B lists exemplary application programming interfaces (APIs) of the invention.

Corresponding reference characters indicate corresponding parts throughout the drawings.

DETAILED DESCRIPTION OF THE INVENTION

Figure 1:
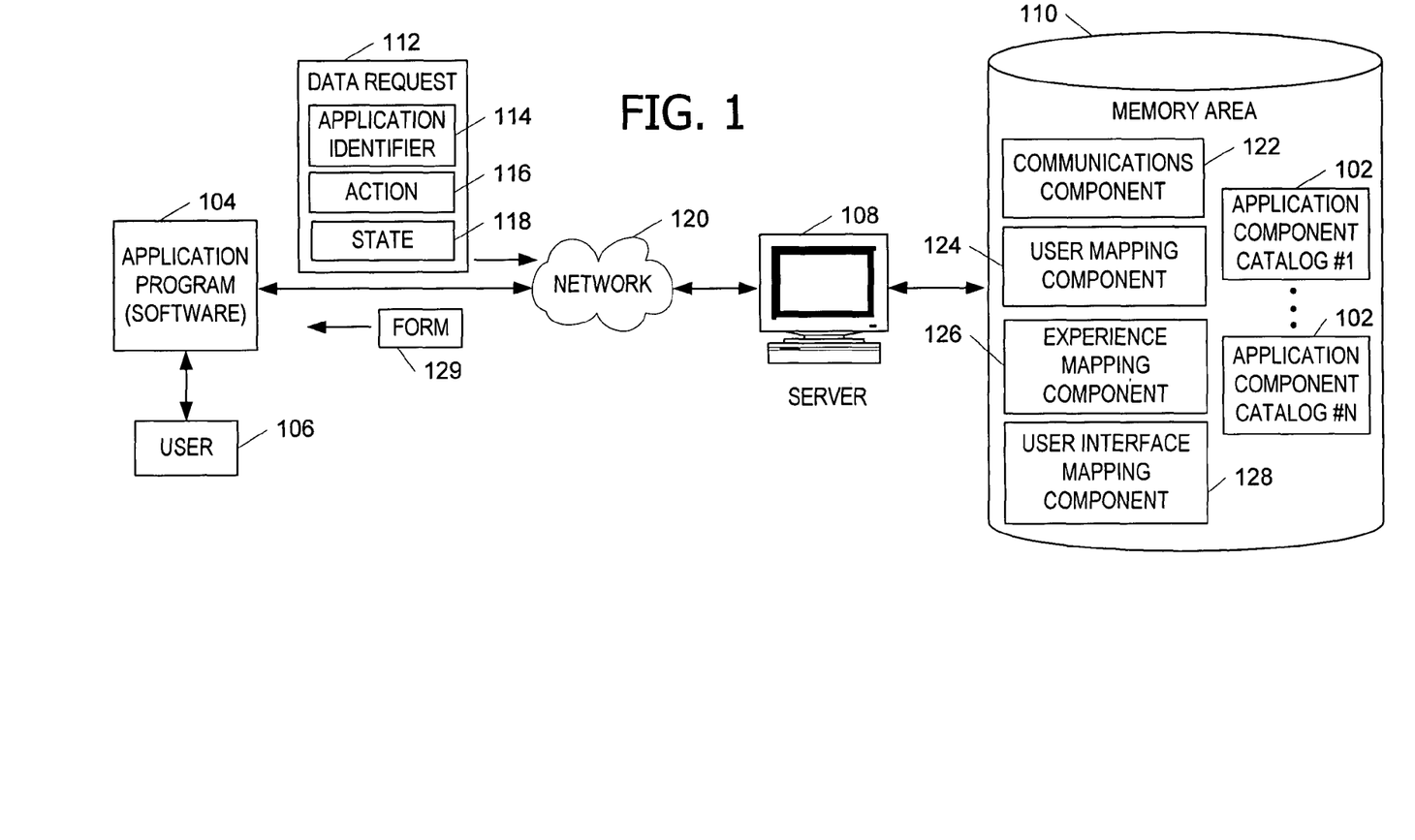
FIG. 1 is an exemplary block diagram illustrating a client application program requesting data from a server accessing an application component catalog.

In an embodiment, the invention includes an application component catalog 102 such as shown in FIG. 1 that defines a set of user interface experiences for an application program 104 (e.g., a web browser), operation system, or the like. The application component catalog 102 defines the way in which a user 106 interacts with the application program 104. In particular, the invention includes a plurality of application component catalogs 102 such as application component catalog #1 through #N. The application component catalog 102 defines the actions supported for each type of data and the business logic associated with each supported action. In one example, the application program 104 has default user interface behavior that may be overridden or extended by adding entries into the application component catalog 102. The entries define an action, state, form, or business logic to be associated with a particular user experience. Customization of the application component catalog 102 in such a manner allows an application to be modified after deployment without having to rewrite the entire application.

The invention includes computer-executable instructions, software, or the like (e.g., executing on a server 108) for connecting a requesting application to the application component catalog 102 to select and activate a user interface experience. The software maps a user request to an action by selecting one or more experiences that apply to the user 106 in a particular context. The server 108 performs the action and returns data to the user 106. In one embodiment, the server 108 delivers business logic (e.g., a script applet) to the requesting application for execution by the requesting application to generate the requested data.

In one embodiment, there is one application component catalog 102 for the most basic form of the application and one application component catalog 102 for each additional experience of the application. Attributes associated with each application component catalog 102 define a base minimum experience for the application. Within an application component catalog, multiple, more specific experiences can be added to provide a more targeted experience for certain client application. An application component catalog can optionally inherit from another application component catalog. In one embodiment, there may be about one hundred application component catalogs 102 and about one hundred forms within each application component catalog 102. However, the number of application component catalogs is not limited in any way. It can be expanded as necessary.

Referring again to FIG. 1, an exemplary block diagram illustrates a client application program 104 requesting data from the server 108 (e.g., a processor) accessing the application component catalog 102. The system of FIG. 1 includes a memory area 110 or other computer-readable medium storing the application component catalog 102. The application component catalog 102 comprises a data structure representing a schema defining user experiences associated with various application programs. The user 106 transmits a data request 112 to the server 108 via the application program 104. The data request 112 (e.g., sent as a uniform resource locator) includes an application identifier 114 identifying the requesting application program 104, an action 116 in the user interface of the requesting application program 104, and a state 118 of the user interface of the requesting application program 104. The application program 104 comprises a server-deployed client application in one embodiment communicating with the server 108 over a network 120 such as the Internet.

The memory area 110 further comprises computer-executable components for providing a user interface experience upon request. The components include a communications component 122, a user mapping component 124, an experience mapping component 126, and a user interface mapping component 128. The communications component 122 operates to receive a request for data from software. The received request identifies the user 106 associated with the request. The received request has an action value and a state value. In one embodiment, the application program 104 is composed of a plurality of user interface components or modules. In such an embodiment, the communications component 122 receives the request from one of the plurality of user interface components or modules. The user mapping component 124 identifies an application component catalog 102 corresponding to the user 106. The application component catalog 102 includes a plurality of user interface experiences. The experience mapping component 126 identifies one of the plurality of user interface experiences in the identified application component catalog 102 based on the software. The identified user interface experience has a plurality of forms associated therewith. The user interface mapping component 128 identifies one of the plurality of forms in the identified user interface experience as a function of the action value and the state value. The communications component 122 provides the identified form (e.g., form 129) to the software.

Figure 2:
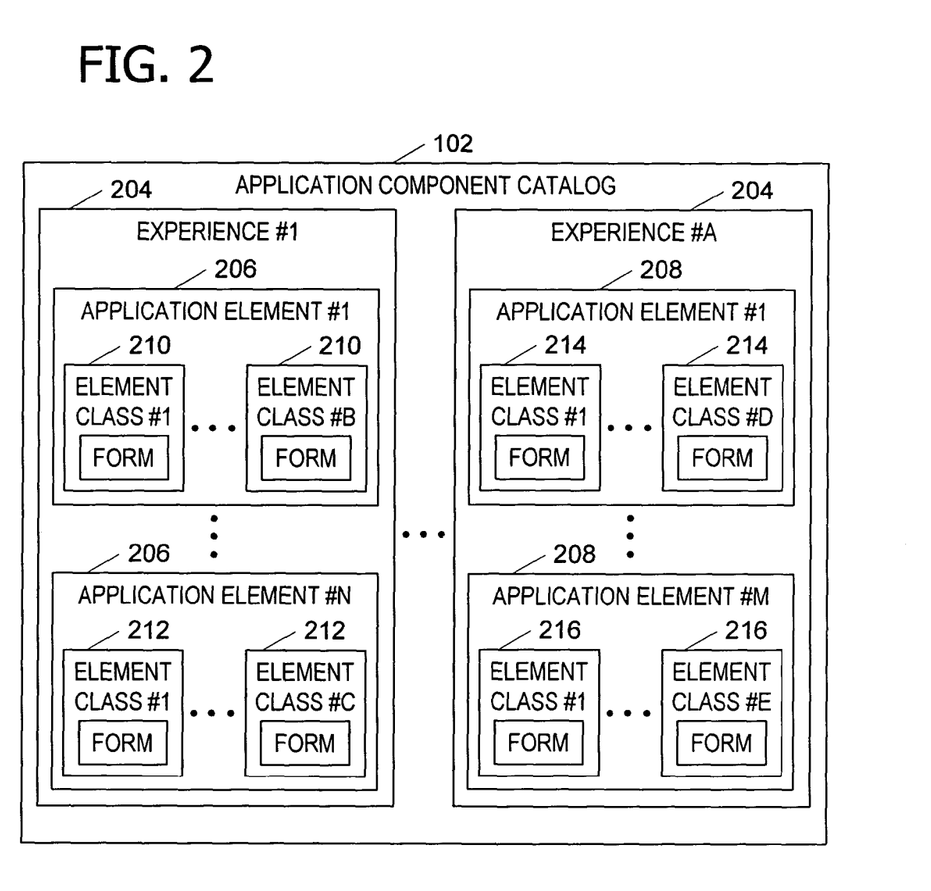
FIG. 2 is an exemplary block diagram illustrating the structure of an application component catalog of the invention.

Referring next to FIG. 2, an exemplary block diagram illustrates the structure of one of a plurality of application component catalogs such as application component catalog 102 in FIG. 1. The application component catalog 102 includes a plurality of experience fields 204 such as experience field #1 through #A. Each experience field 204 stores an experience value representing a user interface experience associated with an application program such as application program 104 in FIG. 1. The application component catalog 102 further includes a plurality of application element fields 206, 208 such as application element field #1 through #N and application element field #1 through #M, respectively, for each of the plurality of experience fields 204. Each of the plurality of application element fields 206, 208 stores an application element value representing an application element associated with the experience value stored in the experience field 204. The application component catalog 102 further includes an element class field 210, 212, 214, 216 for each of the plurality of application element fields 206, 208. As shown in FIG. 2, application element field #1 in experience field #1 includes one or more element class fields 210 such as element class field #1 through element class field #B. Similarly, application element field #N in experience field #1 includes one or more element class fields 212 such as element class field #1 through element class field #C. Application element field #1 in experience field #A includes one or more element class fields 214 such as element class field #1 through element class field #D. Similarly, application element field #M in experience field #A includes one or more element class fields 216 such as element class field #1 through element class field #E. The element class field 210, 212, 214, 216 stores an element class value representing an action, state, or form associated with the application element value stored in the application element field 206, 208. In one embodiment (not shown), the application component catalog 102 further comprises a user scope field storing a property for determining if the application component catalog 102 applies to the user.

Customization of the application component catalog 102 is within the scope of the invention. For example, the processor is further configured to execute computer-executable instructions for receiving, from the application program, an element class value or application element value associated with the application program and storing the element class value or application element value, respectively, in the data structure. In one example, a new form can be added to an application for a new item type by modifying the application component catalog 102 to include an entry for that particular item type and the action being performed, as shown below. In one embodiment, the application component catalog 102 is written in extensible markup language (XML).

```
<ApplicationElement Name="Item">
    <ElementClass Value="ExpenseReport">
        <Mapping Form="ReadExpenseReport.aspx"/>
        <Mapping Action="Accept"
        Form="AcceptExpenseReport.aspx"/>
        <Mapping Action="Decline"
        Form="DeclineExpenseReport.aspx"/>
    </ElementClass>
</ApplicationElement>
```

In this particular example, an additional set of forms can be activated for the "Item" pluggable point in the application.

In one implementation, an exemplary application component catalog 102 includes one or more databases of elements or portions of an application that are to be applied contextually to present a user experience for a particular client application, in a specific application scenario. The databases are XML files in one embodiment, each located in a separate directory, along with related active server page files (e.g., ASPX), local assemblies for controls, and text resources.

Each application component catalog 102, or application component catalog 102 extensions, may be scoped based on attributes of the requesting application and attributes of the user. Inheritance allows the administrator to base an application component catalog 102 off another one if specific functionality is desired for a different set of users.

Here is another example of an application component catalog 102 file.

```
<Catalog xmlns="http://schemas/2004/02/formsCatalog.xsd" Name="Default"
BaseExperience="Sample">
    <Experience Name="Sample">
        <Client Application="BrowserA" MinimumVersion="8.01"
        Platform="OS" />
        <Client Application="BrowserA" MinimumVersion="8.01"
        Platform="OSv1" />
        <ApplicationElement Name="Items">
            <ElementClass>
                <Mapping Form="read.aspx" />
                <Mapping Action="Reply" Form="reply.aspx" />
                <Mapping Action="New" Form="edit.aspx" />
                <Mapping State="Draft" Form="edit.aspx" />
            </ElementClass>
        </ApplicationElement>
        <ApplicationElement Name="PreFormAction">
            <ElementClass Value="PIM.Note">
                <Mapping Action="Reply"
                Form="Clients.Common.ReplyMessagePreFormAction
                ,Clients.Common"/>
                <Mapping Action="ReplyAll"
                Form="Clients.Common.ReplyAllMessagePreFormAct
                ion,Clients.Common"/>
                <Mapping Action="Forward"
                Form="Clients.Common.ForwardMessagePreFormActi
                on,Clients.Common"/>
            </ElementClass>
        </ApplicationElement>
    </Experience>
    <Experience Name="Sample with S/MIME">
        <Client Application="Browser" MinimumVersion="9"
        Platform="OS" ClientControl="SMime" />
        <Client Application="Browser" MinimumVersion="9"
        Platform="OSv1" ClientControl="SMime" />
        <ApplicationElement Name=" Items ">
            <ElementClass>
```

-continued

```
            <Mapping Action="New" Form="editmime.aspx"/>
        </ElementClass>
        <ElementClassValue="PIM.Note.SMIME">
            <Mapping Form="readsmime.aspx" />
            <Mapping Action="Reply" Form="rpfwsmime.aspx" />
            <Mapping State="Draft" Form="editmime.aspx" />
        </ElementClass>
    </ApplicationElement>
  </Experience>
</Catalog>
```

The Catalog element and BaseExperience attribute specify the base experience for this application component catalog 102. In one embodiment, an optional attribute called InheritsFrom allows the application to be deployed with a default set of functionality and then augmented or have default functionality overridden by a custom pluggable component.

The Experience element has one or more client elements there within. The client element is the set of variables that maps a particular client of the application to a specific set of experiences within the application component catalog 102. It is possible to have multiple experiences per application component catalog 102, as seen in this example. For example, clients that identify themselves as being version 9 or greater and having a detectable, installed extension that adds new capabilities get a different set of mappings for certain application elements. If no match exists in this more specific experience, then the base experience mappings would apply.

The ApplicationElement is the predefined pluggable entry point to the application. In this example, there is a pluggable point called Item and another called PreFormAction. In one example, the Item pluggable point is a file name that refers to an aspx page which will be instantiated. In another example, the PreFormAction is the name of a binary and a class name which implements a specified interface that allows the client to do certain processing of a request before activating an aspx page.

Appendix A shows the aspects of an exemplary schema of the invention.

Figure 3:
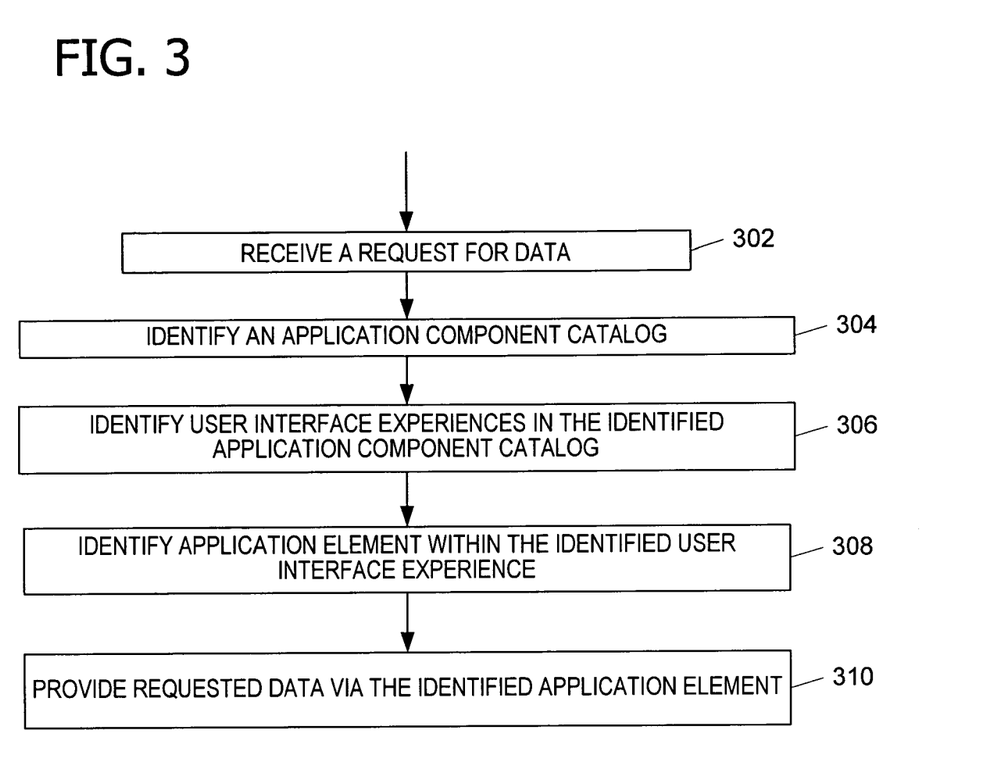
FIG. 3 is an exemplary flow chart illustrating operation of a server performing user experience matching based on a request from a client application program.

Referring next to FIG. 3, an exemplary flow chart illustrates operation of a server performing user experience matching based on a request from a client application program. Prior to performing user experience matching, the invention performs some initialization functions. When a user logs in, the invention knows the client information and the application component catalogs or form mappings available for that user. At login time, the invention builds a list of experiences available to the user so that at form lookup time, the invention does not have to look at client information again. The invention the experiences (e.g., a set of forms) that are valid for the user and uses this information when making a lookup.

When an application is initialized, the application component catalogs are loaded into memory and verified to be correct. Loading the application component catalogs includes parsing the catalogs, resolving dependencies (e.g., since an application component catalog can inherit from another one, the invention validates inheritance references once the application component catalogs have been parsed, throwing an exception if an application component catalog reference does not exist), generating base experiences (e.g., a sorted list of base experiences are used for quick matching of users to application component catalogs), and sorting the application component catalog experiences.

In one embodiment, the invention includes a computerized method for providing a user interface experience upon request. The computerized method includes receiving a request for data from software at 302. The received request identifies a user associated with the request. The method identifies an application component catalog as a function of the user at 304. The application component catalog includes a plurality of user interface experiences. The method further identifies one of the plurality of user interface experiences in the identified application component catalog as a function of the software at 306. The identified user interface experience has a plurality of application elements associated therewith. The method further includes identifying one of the plurality of application elements as a function of data in the request (e.g., an action value and a state value) at 308 and providing the requested data via the identified application element at 310. In one embodiment, one or more computer-readable media have computer-executable instructions for performing the computerized method illustrated in FIG. 3.

In a particular embodiment, when a client connects to the application, a lookup is done in the application component catalog to find the set of experiences that apply to that particular client's capabilities. During experience matching, the invention looks for the most specific, applicable application component catalog by looking at the base experience for each application component catalog. The most specific application component catalog will provide the richest client experience given the capabilities of the client. A collection that contains the base client/experience mappings in the application component catalogs is pre-sorted least specific to most specific to allow for binary searching. In the event of multiple matches, an application component catalog that inherits from another one is more specific than one that does not inherit. If there are still multiple matches, the first one is selected, though other rules are within the scope of the invention.

The variables used from the client to do the matching include, in one example, application, version, platform, and client extensions (e.g., S/MIME Control). The invention is not limited to these variables. The system is extensible to allow for additional criteria for experience matching. Once the experience matching is complete, this information can be cached to allow for faster application element matching.

The following describes how to generate the list of matching experiences. Throughout the generation of this list, a separate list of matching experience names is maintained.

1. Check for most specific match on provided client information
2. Set control to wildcard and find matches
3. Set platform to wildcard and find matches
4. Set application to wildcard and find matches In case of an ambiguous result, the order in which rows should be selected is: //ElementClass/@Value, //Mapping/@Action, //Mapping/@State, //Client/@Application, //Client/@Platform, //Client/@MinimumVersion (where version>=MinimumVersion), and //Client/@Control. In the event of multiple matches at this point, the greater of the MinimumVersions is more specific. If there are multiple matches, the invention takes the mapping from the inheriting catalog. In an example with catalogs A, B, and C, catalog C inherits from catalog B and catalog B inherits from catalog A. If a mapping is in catalog A, catalog B, and catalog C, then the chosen match is the one from catalog C. If no match is found at any of the above and the application component catalog inherits from another application component catalog, a new lookup is performed on the inherited application component catalog. At a minimum in one embodiment, //ElementClass/@Value, //Mapping/@Action and //Mapping/@State should match for a lookup to be successful.

In another embodiment, a matching algorithm of the invention is shown below.
1. Create key based off application, class, action, and state
2. Get application component catalog associated with most specific experience, attempt lookup in that application component catalog's list of forms, if find a match, then return the match and exit.
3. Repeat step 2 for each successively less specific experience until a match is found. If no match is found, move on to next step.
4. Change state to wildcard and repeat steps 2-3. If still no match, the lookup has failed.
5. Change action to wildcard and repeat steps 2-3. If still no match, move on to next step.
6. Change the class to a wildcard and repeat steps 2-3. If still no match, move on to next step.

After identifying the appropriate application component catalog, the invention performs a lookup into the application component catalog with the following pieces of information: application element, element class, action, and state. The application component catalog lookup algorithm includes logic for certain variables having precedence over other ones and reverting to wildcard matches when no exact match exists.

After a successful lookup into the application component catalog, the appropriate action is taken based on the returned value. In one example, the mapping value is the file name of an ASPX page that will be instantiated by a runtime engine. The PreFormHandler is a class name that gets instantiated.

Figure 4:
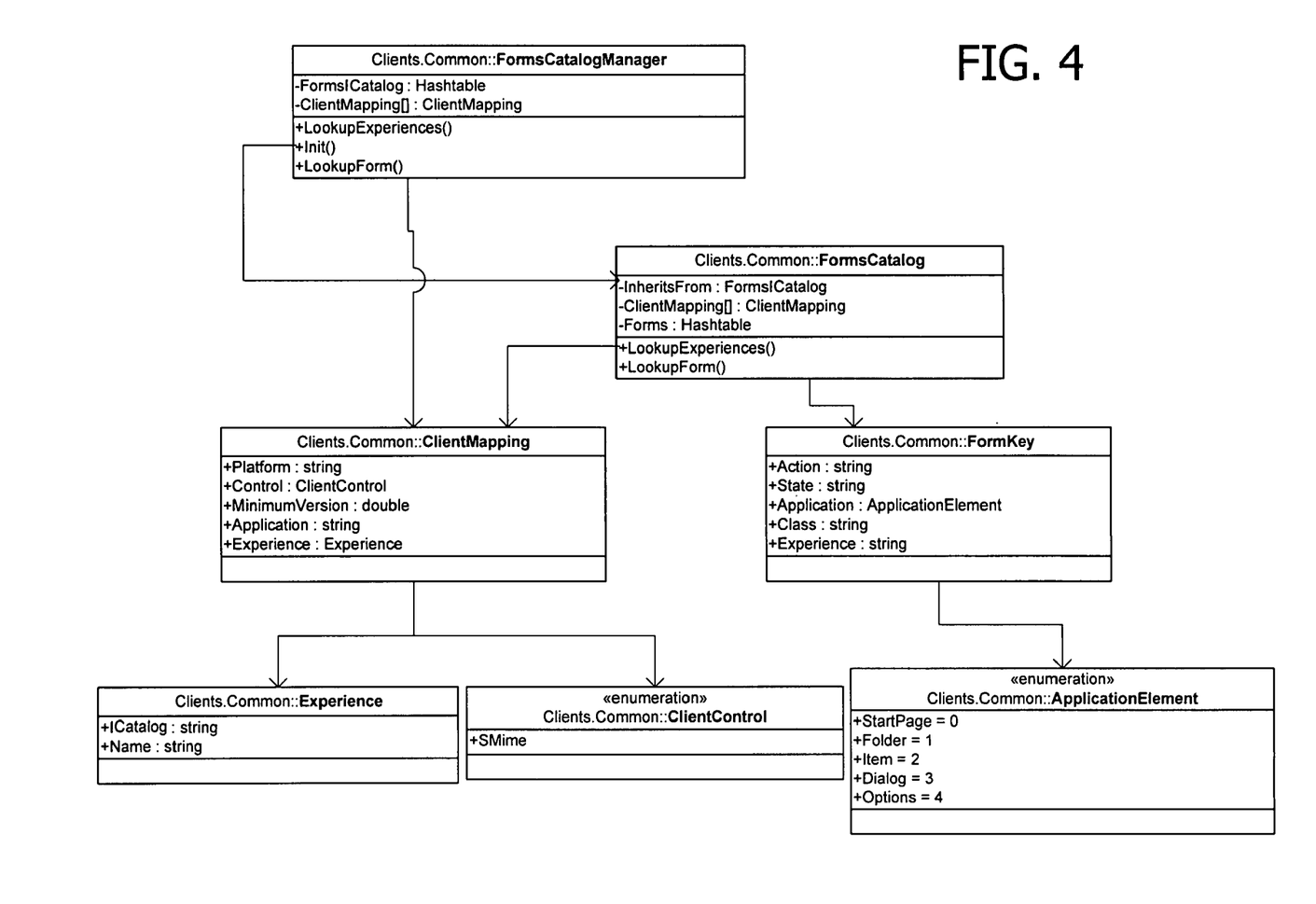
FIG. 4 is an exemplary schema for an application component catalog of the invention.

Referring next to FIG. 4, an exemplary schema for an application component catalog of the invention is shown. The application component catalog is managed by a FormsCatalogManager class. At application startup, the FormsCatalogManager is initialized and loads the application component catalogs from the file system. Calls to lookup forms are done via APIs exposed by the FormsCatalogManager and the FormsCatalog.

In FIG. 4, the ClientControl class is an enumeration that makes up part of the definition of a client. The Experience class defines an experience and the application component catalog to which it belongs. In one embodiment, a collection of these is held by every user and used every time a form lookup is done to prevent having to determine the set of valid forms for the user every time. The ClientMapping class provides a mapping of a Client to an Experience. This is used by the FormsCatalogManager and FormsCatalog to provide mappings of clients to forms catalogs and experiences. The FormsCatalogManager includes all the application component catalogs and all the logic for matching users with an application component catalog, experiences, and doing form lookups. The FormsCatalog is a hash table of all the forms application component catalogs keyed off of the application component catalog name. The value is a FormsCatalog object.

Exemplary application programming interfaces (APIs) are described in Appendix B.

Exemplary Operating Environment

Figure 5:
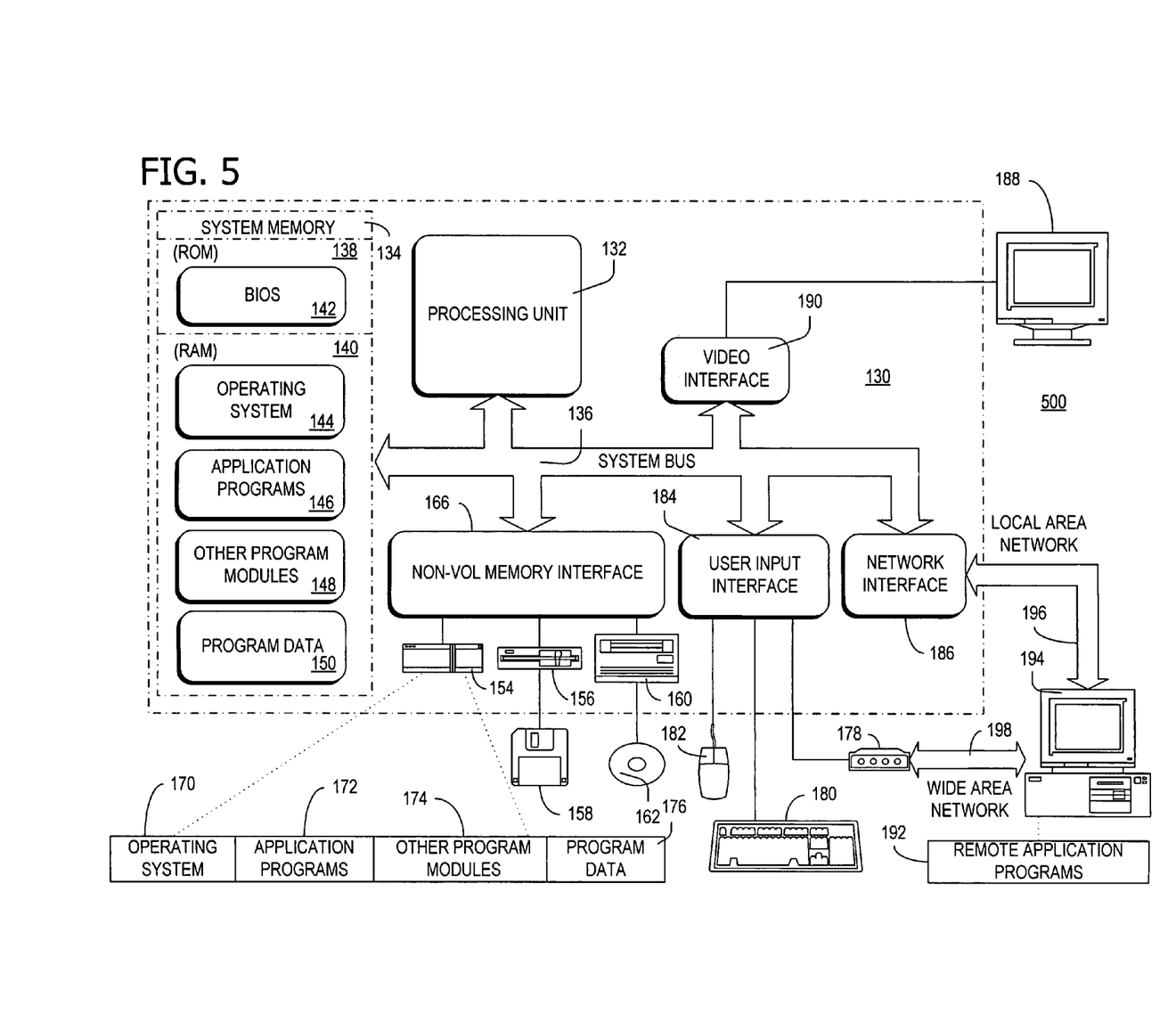
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 3 to implement the invention.

The following exemplary user scenarios further illustrate the invention. In one scenario, User A uses her laptop and starts a browser to connect to a web mail client over an intranet. After authenticating, User A's browser shows the "Basic" hypertext markup language (HTML) experience where User A can access mail and calendaring items and can browse through the address book. In another scenario, User A uses a web kiosk to check for mail messages and upcoming meetings. When User A connects to the mail server, User A is presented with a login screen that allows User A to choose the Basic or Premium experience and the starting page. User A types in credentials and selects an experience which is subsequently rendered to User A.

In still another scenario, User A chooses an experience that best suits the browser on a wireless telephone. Alternatively, experience selection may be performed automatically via the application component catalog when the client application identifies itself as a wireless phone-based browser. In yet another scenario, a service provider may host custom forms and a custom starting page. For example, the electronic mail message form is replaced by a new form that integrates with a database on another server. When reading electronic mail messages from customers, a preview pane and read note form display information integrated with live data from the database. The context menu for unmodified items also includes two new options, "Add sender to customer contacts", which launches an application on the server with no additional UI, and "Add recipients to customer contacts", which launches a custom form on the mail server.

Another exemplary application component catalog is shown below.

```
<?xml version="1.0" encoding="utf-8" ?>
<Catalog xmlns="http://schemas/2004/02/formscatalog.xsd"
Name="Default"
BaseExperience="Sample">
    <Experience Name="Sample">
        <Client Application="Browser" MinimumVersion="8.01"
        Platform="OS" />
        <ApplicationElement Name="Items">
            <ElementClass>
                <Mapping Form="read.aspx" />
                <Mapping Action="Reply" Form="reply.aspx" />
                <Mapping Action="New" Form="edit.aspx" />
                <Mapping State="Draft" Form="edit.aspx" />
            </ElementClass>
        </ApplicationElement>
    </Experience>
    <Experience Name="Sample with S/MIME">
        <Client Application="Browser" MinimumVersion="9"
        Platform="OS" ClientControl="SMime" />
        <ApplicationElement Name=" Items ">
            <ElementClass>
                <Mapping Action="New" Form="editmime.aspx"/>
            </ElementClass>
            <ElementClass Value="PIM.Note.SMIME">
                <Mapping Form="readsmime.aspx" />
                <Mapping Action="Reply"
                Form="rpfwsmime.aspx" />
                <Mapping State="Draft" Form="editmime.aspx" />
            </ElementClass>
        </ApplicationElement>
    </Experience>
</Catalog>
```

The following flattened selection Table 1 below is created from the exemplary application component catalog shown above. A Catalog column and a Control column have been removed from Table 1 below for clarity.

TABLE 1

Selection Table Created from Exemplary Application Component Catalog.

| Row | App | MinVer | App Elements | Class | Action | State | Form |
|---|---|---|---|---|---|---|---|
| 1 | Browser | 8.01 | Items | * | * | * | Read.aspx |
| 2 | Browser | 8.01 | Items | * | Reply | * | Reply.aspx |
| 3 | Browser | 8.01 | Items | * | New | * | Edit.aspx |
| 4 | Browser | 8.01 | Items | * | * | Draft | Edit.aspx |
| 5 | Browser | 9 | Items | * | New | * | Editmime.aspx |
| 6 | Browser | 9 | Items | PIM.Note.SMIME | * | * | Readsmime.aspx |
| 7 | Browser | 9 | Items | PIM.Note.SMIME | Reply | * | Rpfwsmime.aspx |
| 8 | Browser | 9 | Items | PIM.Note.SMIME | * | Draft | Editmime.aspx |

The following examples process incoming requests based on Table 1 above.
1. A Browser9 user without S/MIME control opens a meeting request that arrived in the inbox. The Meeting request item has a class of "PIM.Schedule.Meeting.Request", and a state of "Sent". The Request has an action of "Open". Row 1 is selected to bind to the item.
2. A Browser9 user without S/MIME control selects a previously saved draft meeting request and click the "Reply" toolbar button. The Meeting request item has a class of "PIM.Schedule.Meeting.Request", and a state of "Draft". The Request has an action of "Reply". While Rows 1, 2 and 4 are potential matches, Rows 2 and 4 each have one more //Mapping/@*attribute than Row 1, so Row 1 is eliminated. According to the most-specific rule, a Mapping with an action and no specific state takes precedence over a Mapping with no action. As such, Row 2 is selected.
3. A user with S/MIME control clicks the "New" button in a message folder. The default class in a message folder is "PIM.Note". While Rows 3 and 5 are potential matches, Row 5 takes precedence over Row 3 because Row 5 is more specific in having a //Client/@Control attribute set and matching the User-Agent. As such, Row 5 is selected.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

Attributes of an exemplary application component catalog schema are shown below. The exemplary schema is written in extensible markup language (XML) path syntax.

/Catalog

Root node of forms application component catalog

/Catalog/@Name

Attribute, String

Describes the application component catalog for purposes of the person viewing the application component catalog XML file. This name matches the folder in which the application component catalog XML document is located.

/Catalog/@InheritsFrom

Attribute, String

The relative path to the directory containing the application component catalog XML file (and its /Catalog/@Name value.) Specifying this will allow an application component catalog in another directory to inherit an existing //Experience.

/Catalog/@BaseExperience

Attribute, String

The name of the base Experience for the application component catalog. All additional Experience's in this application component catalog are more specific than the specified base Experience.

If this application component catalog is inheriting from another application component catalog, the BaseExperience specified in the parent Application component catalog is the BaseExperience for this application component catalog. In this case, the BaseExperience attribute is ignored and all Experiences defined in this application component catalog should be as specific as or more specific than the BaseExperience of the parent application component catalog.

/Catalog/Experience

Element, minOccurs="1" maxOccurs="unbounded"

Node which describes the filter applied to scope the application experience to a particular browser/client type.

/Catalog/Experience/ApplicationElements

Element, minOccurs="1" maxOccurs="unbounded"

Node which contains items for a component of the application.

/Catalog/UserScope

Element, minOccurs="0" maxOccurs="1"

Node used to scope the form application component catalog to a set of users based on attributes of their particular configuration. Limited to one property and value match per experience. This value is not inherited from a parent application component catalog if one exists.

//UserScope

//UserScope/@Provider

Attribute, String

Name of provider to query for object matching that of the connecting user.

//UserScope/@Property

Attribute, String

Property name of user's object to retrieve and perform match. Forms application component catalog logic will need to add this to the list of attributes requested when a user connects to the application.

//UserScope/@Value

Attribute, String

Value of property to perform match. Blank attributes are permitted. A missing Value attribute in a UserScope node indicates a null value, meaning that in order to match, the attribute should not exist on the user's object.

//UserScope/@MatchRule

Attribute, String

Rule to apply when comparing the UserScope/@Property of a user's object to the UserScope/@Value for a particular application component catalog.

Possible values for match type:
- EQUALS—the string value of a user's UserScope/@Property is an exact, case-insensitive match of the string value of a application component catalog's UserScope/@Value
- PREFIX—the prefix of the string value of a user's UserScope/@Property is an exact, case-insensitive match of the string value of an application component catalog's UserScope/@Value.
- SUFFIX—the suffix of the string value of a user's UserScope/@Property is an exact, case-insensitive match of the string value of a application component catalog's UserScope/@Value.

//Experience

This element is used in an application component catalog to define the experience for a particular set of clients. If this is the BaseExperience as specified in the /Catalog/@BaseExperience, then it defines the baseline set of clients and forms for the experience.

This element can also be used to extend or override a particular experience for a more specific client extension, e.g., S/MIME control is installed on the client, or the browser supports additional features such as editing HTML.

Including a more specific //Experience in the application component catalog will:
- (a) Enable additional mappings for clients that have special features (e.g., S/MIME control, HTML editor).
- (b) Allow 3$^{rd}$ parties to extend experiences without modifying the original application component catalog.

//Experience/@Name

Attribute, String

Name of experience, e.g. "Premium", "XHTML". Should be unique for an application component catalog for the /Catalog/@BaseExperience to function.

//Experience/Client

Element, minOccurs="1" maxOccurs="unbounded"

Node defining which Client application characteristics to use when attempting to provide a mapping to a form. The scope of the Client is the Experience in which it is contained. This element should appear before any /ApplicationElement
    <Clent Application="Browser" Platform="OS">

//Exeperience/Client/@Application

Attribute, String, Default = None

Client application name or type.

//Experience/Client/@Platform

Attribute, String, Default = * (wildcard)

Client operating system or device platform. One way to configure a wildcard match is to remove this attribute from a mapping.

//Experience/Client/@MinimumVersion

Attribute, String, Default = * (wildcard)

Minimum application version for experience. Can be single number or complete version. One way to configure a wildcard match is to remove this attribute from a mapping. Any special client matching logic that needs to be done at a service pack or other level not defined in this spec should be handled outside the forms application component catalog.

//Experience/Client/@MaximumVersion

Attribute, String, Default = * (wildcard)

Maximum application version for experience, necessary to scope experience to earlier versions of a particular client application. Especially useful to scope exceptions or the set of forms that only render when a client extension such as the S/MIME control is installed on the client. One way to configure a wildcard match is to remove this attribute from a mapping.

//Experience/Client/@Control

Attribute, String, Default = * (wildcard)

Keyword for client controls that extend the browser application and allow for different user experience. Option for third party to enable new user experience by adding controls, such as a new control to support digital rights management functionality, or to use this to pick off keywords in the client identification information, such as the User-Agent string.

//ApplicationElement

//ApplicationElement/@Name

Attribute, String

Name of the application element, such as:

FolderForms

ItemForms

QuickLaunchComponents

NavBarComponents

OptionsComponents

FormsAuthForms

ErrorForms

//ApplicationElement/@IconResource

Attribute, String

URI stem of the image associated with the application element.

//ApplicationElement/TextResource

Element, String

Name of resource in resource libraries that describes the application element. If TextResource/@ResourceLibrary is defined, then the string will be obtained from that resource library.

For example, these strings will map to a localized resource akin to "User Options", "Navigation Pane", "Forms-Based Authentication Components"

//ApplicationElement/TextResource/@ResourceLibrary

Attribute, String, Default = None

Filename of third-party library or .resx file that contains the resource identified by the value of TextResource //ApplicationElement/ElementClass Element, minOccurs="1", maxOccurs="unbounded"

Node defining the set of associations to forms or controls of a particular application element class.

//ElementClass/@Value

Attribute, String, Default = * (wildcard)

Class of item to match against the "Item.Class" property of an data item. One way to configure a wildcard match is to remove this attribute from a mapping.

//ElementClass/@IconResource

Attribute, String

URI stem of the image associated with the element class. This is not the icon used in views—a separate mapping table should exist for that purpose.

//ElementClass/TextResource

Element, String

Name of resource that describes the element class. If TextResource/@ResourceLibrary is defined, then the string will be obtained from that resource library.

For example, these strings will map to a localized resource akin to "E-mail message", "Meeting request", "Non-delivery report"

//ElementClass/TextResource/@ResourceLibrary

Attribut, String, Default = None

Filename of third-party library or .resx file that contains the resource identified by the value of TextResource //ElementClass/Mapping Element, minOccurs="1", maxOccurs="unbounded"

Node containing the mappings of actions, state and forms/controls

//Mapping/@Action

Attribute, String, Default = * (wildcard), Optional

Name of the action available for a mapping. Case-insensitive. One way to configure a wildcard match is to remove this attribute from a mapping.

//Mapping/@State

Attribute, String, Default = * (wildcard), Optional

Flags enumeration of state of item required to match for a mapping. Not used for generic workflow state. One way to configure a wildcard match is to remove this attribute from a mapping.

//Mapping/@Form

Attribute, String, Default=none

Name of form, control or other component used to bind to, render and present the appropriate user experience and application logic for a mapping. The form should be in the same directory structure as the application component catalog.

//Mapping/@IconResource

Attribute, String, Optional

URI stem of the image associated with the mapping. In general, this will be the icon presented in a context menu or toolbar associated with the element class.

//Mapping/@StatusCode

Attribute, String, Optional

For mapping status codes to user experience elements. This is the alternative to overloading //Mapping/@State. Useful for error handling and forms-based authentication scenarios.

//Mapping/TextResource

Element, String

Name of resource that describes the mapping (action). If TextResource/@ResourceLibrary is defined, then the string will be obtained from that resource library.

For example, these strings will map to a localized resource akin to "Post reply in this folder", "Create new message", "Configure Mobile Browse settings"

//Mapping/TextResource/@ResourceLibrary

Attribute, String, Default = None

Filename of third-party library or .resx file that contains the resource identified by the value of TextResource

APPENDIX B

Exemplary application programming interfaces (APIs) are described below.

public Init

Parameters
 String directory—the directory of the root of the application.

This routine is called on application startup. This will parse all application component catalogs contained within a specific forms directory and load them into internal data constructs. This is called before any form or application component catalog lookup is done.

public LookupExperiences

Return Value
 Experience[ ]—matching experiences, otherwise null

| Parameters | |
| --- | --- |
| string | application |
| double version | |
| string | platform |
| ClientControl | control |

The purpose of this API is to determine which application component catalog should be used for the duration of the session. This will cut down on the time it takes to do a form lookup later on.

If a user can not be mapped to at least one user experience, then the user will be redirected to the error form with appropriated information.

public LookupForm

Return Value
 string—relative path to matching form e.g. "/premium/readnote.aspx"
 or string.Empty if no match is found

| Parameters | |
| --- | --- |
| FormKey | formKey |
| Experience[ ] | experiences |

The FormsCatalog stores information about the experiences within it, inherited application component catalog. When a user logs in, the first thing that is done is to find which FormsCatalog the user will use for the duration of their session. Within that forms application component catalog, we also want to know which specific experiences apply to that user. We can look this information up at login time, then cache it on the user context object so that we don't have to lookup this information for every request.

Forms

List of all the forms in the application component catalog keyed off of FormKey. The value in the hash table is the name of the form e.g. "foo.aspx"

ClientMapping[ ]

This array is used to find all experiences that match a specific client.

LookupForm

Return Value string—relative path to matching form, e.g., "/premium/readnote.aspx"

or string.Empty if no match is found

| Parameters | |
|---|---|
| FormKey | formKey |

Checks the application component catalog's hashtable for a matching form. If not found, returns string.Empty.

LookupExperiences

Return Value

Experience[ ]—matching experiences, otherwise null

| Parameters | |
|---|---|
| string | application |
| double version | |
| string | platform |
| ClientControl | control |

This returns a unique list of all the experiences the provided information matches. The results will be ordered most specific to least specific.

The FormKey is used to look up a form in an application component catalog's hash table of forms.

What is claimed is:

1. A system comprising:

a computer-readable storage medium storing an XML schema defining user experiences associated with various application programs, said XML schema comprising:

a plurality of experience fields, each of the plurality of experience fields storing an experience value representing a user interface experience associated with an application program, wherein at least one of the plurality of experience fields stores a default experience value representing a default user interface experience;

a plurality of application element fields associated with each of the plurality of experience fields, each of the plurality of application element fields storing an application element value representing an application element associated with the experience value stored in the experience field; and an element class field associated with each of the plurality of application element fields, the element class field storing an element class value representing an action, state, or form associated with the application element value stored in the application element field; and a processor configured to execute computer-executable instructions for:

receiving a request for data from the application program specifying a version of the application program, specifying a platform and specifying a client extension of a client executing the application program;

identifying, in the XML schema, a group of matching experience fields as a function of the received request, said identifying comprising:

determining a specific experience field corresponding to the received request based on the specified application program, based on the specified version of the application program, based on the specified platform of the client executing the application program, and based on the specified client extension of the client;

modifying the specified client extension of the received request to a wildcard;

modifying the specified platform of the received request to a wildcard;

modifying the specified application program of the received request to a wildcard; and determining additional specific experience fields based on each modified request;

identifying a most specific experience field from the group of matching experience fields which is more specific than the other experience fields of the group, wherein the group of matching experience fields comprises the determined specific experience field and all of the determined additional specific experience fields;

identifying one of the plurality of application element fields associated with the identified experience field as a function of the requested data;

identifying one of the plurality of element class fields associated with the identified application element field as a function of the action, state, or form associated with the application element value, said identifying further comprising selecting a form associated with the identified element class field; and providing the selected form to the application program in response to the received request.

2. The system of claim 1, wherein the XML schema represents an application component catalog.

3. The system of claim 1, wherein a user transmits the request for data via the application program, and wherein the XML schema further comprises a user scope field storing a property for determining if the XML schema applies to the user.

4. The system of claim 1, wherein the application program comprises a server-deployed client application.

5. The system of claim 1, wherein the processor is further configured to execute computer-executable instructions for:

receiving, from the application program, an element class value associated with the application program; and storing the element class value in the XML schema.

6. The system of claim 1, wherein the processor is further configured to execute computer-executable instructions for:

receiving, from the application program, an application element value associated with the application program; and storing the application element value in the XML schema.

7. The system of claim 1, wherein the computer-readable storage medium stores a plurality of the XML schemas, and wherein at least one of the plurality of XML schemas inherits an experience value, an application element value, or an element class value from another one of the plurality of XML schemas.

8. A computerized method for providing a user interface experience upon receiving a request for data from software, said received request identifying a user associated with the request, identifying the software, identifying an element class, including an action value and including a state value, said computerized method comprising:

creating a key based on the identified software, the identified element class, the identified action and the identified state;

identifying an application component catalog from a plurality of application component catalogs as a function of the user, said application component catalog including a plurality of user interface experiences, said application component catalog being represented as an XML schema;

performing a lookup in a plurality of forms associated with the plurality of user interface experiences of the identified application component catalog;

if one or more matching forms to the created key is found from the plurality of forms, returning the most specific form of the matching forms to the software; and     if no matching forms are found in the plurality of forms, performing a lookup in the plurality of forms after setting the state and one or more of the action and the class of the created key to wildcard, wherein if no match is found upon setting at least the state of the created key to wildcard, a fail value is returned.

9. The computerized method of claim 8, wherein the software comprises a client application deployed by a server application.

10. The computerized method of claim 8, wherein receiving the request for data from software comprises receiving the request for data from the user via the software.

11. The computerized method of claim 8, wherein the software comprises one or more of the following: an operating system and an application program.

12. The computerized method of claim 8, wherein the software comprises a plurality of user interface components, and wherein receiving the request comprises receiving the request from one of the plurality of user interface components.

13. The computerized method of claim 8, wherein one or more computer-readable storage media have computer-executable instructions for performing the computerized method recited in claim 8.

14. One or more computer-readable storage media having computer-executable components for providing a user interface experience upon request, said components comprising:

a communications component for receiving a request for data from software, said received request identifying a user associated with the request, said received request specifying an action value and a state value, said received request further specifying a version of the software, a platform of client of the user executing the software, and specifying a client extension of the client;

a user mapping component for identifying an application component catalog corresponding to the identified user, said application component catalog including a plurality of user interface experiences, wherein at least one of the plurality of user interface experiences represents a default user interface experience, said application component catalog being represented as an XML schema;

an experience mapping component for identifying one of the plurality of user interface experiences in the identified application component catalog, said identified user interface experience having a plurality of forms associated therewith, said identified user experience being the most specific experience field from a group of matching experience fields, said matching experience fields generated by:

determining a specific experience field corresponding to the received request based on the software, the specified version of the software, the specified platform of the client executing the software, and the specified client extension of the client;

modifying the specified client extension of the received request to a wildcard;

modifying the specified platform of the client of the received request to a wildcard; and         modifying the specified software of the received request to wildcard;

determining additional specific experience fields based on each modified request;

wherein the group of matching experience fields comprises the determined specific experience field and all the determined additional specific experience fields; and     an user interface mapping component for identifying one of the plurality of forms in the identified user interface experience as a function of the action value and the state value, wherein the communications component provides the identified form to the software.

15. The computer-readable storage media of claim 14, wherein the software comprises a server-deployed client application.

16. The computer-readable storage media of claim 14, wherein the software comprises a plurality of user interface components, and wherein the communications component receives the request from one of the plurality of user interface components.

17. The computer-readable storage media of claim 14, wherein the user mapping component identifies the most specific application component catalog corresponding to the user.

* * * * *